United States Patent [19]

Cobb, Jr. et al.

[11] Patent Number: 4,984,144
[45] Date of Patent: Jan. 8, 1991

[54] HIGH ASPECT RATIO LIGHT FIXTURE AND FILM FOR USE THEREIN

[75] Inventors: Sanford Cobb, Jr., St. Mary's Point; John F. Dreyer, Jr., North Oaks, both of Minn.

[73] Assignee: Minnesota Mining and Manufacturing Company, St. Paul, Minn.

[21] Appl. No.: 181,652

[22] Filed: Apr. 14, 1988

Related U.S. Application Data

[63] Continuation of Ser. No. 47,644, May 8, 1987, abandoned.

[51] Int. Cl.$^5$ .................................. F21V 5/02
[52] U.S. Cl. ........................ 362/339; 362/31; 362/329; 362/309; 350/167; 350/286
[58] Field of Search ............... 362/336, 337, 308, 309, 362/330, 339, 328, 329, 326, 327, 31; 350/167, 286; 428/167

[56] References Cited

U.S. PATENT DOCUMENTS

| 1,245,836 | 11/1917 | Waggoner | 362/337 |
| 2,050,429 | 8/1936 | Dorey et al. | 362/224 |
| 2,818,500 | 12/1957 | Franck | 362/224 |
| 3,049,616 | 8/1962 | Davis | 362/224 |
| 3,179,796 | 4/1965 | Rolph | 362/339 |
| 3,539,799 | 11/1970 | Dangauthie | 362/328 |
| 3,716,710 | 2/1973 | Clostermann et al. | 362/339 |
| 3,740,119 | 6/1973 | Sakurai | 350/167 |
| 3,764,800 | 10/1973 | Clostermann | 362/339 |
| 4,118,763 | 10/1978 | Osteen | 362/339 |
| 4,177,505 | 12/1979 | Carel | 362/309 |
| 4,411,493 | 10/1983 | Miller | 350/262 |
| 4,497,860 | 2/1985 | Brady | 428/156 |
| 4,530,041 | 7/1985 | Yamai et al. | 362/339 |
| 4,805,984 | 2/1989 | Cobb, Jr. | 350/96.1 |

FOREIGN PATENT DOCUMENTS

| 1021159 | 3/1966 | United Kingdom | 362/309 |
| 694291 | 7/1940 | Fed. Rep. of Germany | 362/309 |
| 16675 | 5/1955 | Fed. Rep. of Germany | |
| 1125856 | 3/1962 | Fed. Rep. of Germany | 362/308 |

*Primary Examiner*—Ira S. Lazarus
*Assistant Examiner*—D. M. Cox
*Attorney, Agent, or Firm*—Donald M. Sell; Walter N. Kirn; Stephen W. Buckingham

[57] ABSTRACT

A high aspect ratio light fixture has an optical window with a light extraction film therein. The light extraction film has a plurality of linear prisms facing the interior of the light fixture. In one embodiment of the invention the prisms are triangular in shape while in another they are four sided.

9 Claims, 1 Drawing Sheet

HIGH ASPECT RATIO LIGHT FIXTURE AND FILM FOR USE THEREIN

This is a continuation of application Ser. No. 047,644 now abandoned filed May 8, 1987.

TECHNICAL FIELD

The present invention relates to light fixtures and more particularly to light fixtures capable of being manufactured having a very high aspect ratio.

BACKGROUND ART

In some applications light fixtures having high aspect ratios, i.e., having length and width which are much greater than their thickness, are desirable. For example, automotive taillights are preferably designed to be as thin as possible because volume required for such space typically comes at the expense of luggage area.

One approach to producing such high aspect ratio light fixtures is described in U.S. Pat. application Ser. No. 016,858, field Feb. 20, 1987, now U.S. Pat. No. 4,789,921 and commonly assigned herewith. One system of that application, a Fresnel type reflector imitates the action of a parabolic reflector when it is formed into a cone. Such a reflector provides a higher aspect ratio than is possible with a standard smooth parabolic reflector, but has greater light gathering efficiency than a flat Fresnel type reflector.

Another approach is described in U.S. Pat. application Ser. No. 030,033, filed Mar. 24, 1987, now U.S. Pat. No. 4,799,157 and also commonly assigned herewith. In the approach of application Ser. No. 030,033, a special reflective film is prepared which reflects light at a right angle to the direction from which the light enters the film. Such a film is used to direct light out of the light fixture.

DISCLOSURE OF INVENTION

A light fixture according to the present invention utilizes a film having a series of linear prisms on one surface. This film is placed in the optical window of a light fixture with the prisms to the inside of the fixtures. These prisms are designed so that light will enter through a first surface of a prism and will be totally and internally reflected by a second. The light will then be emitted through the opposite surface of the film. In one embodiment of the invention the cross-section of the prisms form isosceles triangles having an angle of approximately 69°. In another embodiment the prisms have four exposed faces. The two faces which are closest to the center of the film meet the film at a large angle while the projection of each of the other two sides meets the film at a much smaller angle.

DETAILED DESCRIPTION

Figure 1:
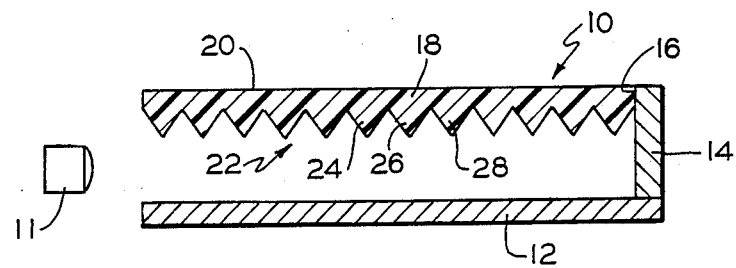
FIG. 1 is a schematic view of a light fixture according to the invention.

A light fixture of the present invention, designated generally as 10, is shown in FIG. 1. Light fixture 10 includes light source 11 and sides 12 and 14. Sides 12 and 14, along with other sides, not shown, form an enclosure having an optical window 16. Light source 11 emits a cone of light in a direction such that the light strikes film 18 at a small angle with respect to the plane of the film. In optical window 16 is a light extractor film 18. Light extractor film 18 has a smooth surface 20 and a structured surface 22. Structured surface 22 has thereon a plurality of linear prisms such as prisms 24, 26, and 28 facing the interior of the enclosure. The axes of prisms 24, 26, and 28 run perpendicular to the direction of light coming from light source 11. In one embodiment sides 12 and 14 are made reflective by using mirrors or a reflective tape such as that sold under the trade name "Silverlux" by Minnesota Mining and Manufacturing Company. Alternatively side 14 could be replaced by an additional light source.

Figure 2:
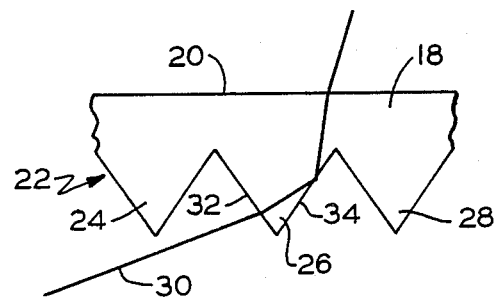
FIG. 2 is an expanded view of the light extraction film utilized in the light fixture of FIG. 1.

FIG. 2 shows an enlargement of a portion of film 18 including prisms 24, 26 and 28. A light beam 30 comes from light source 11 of FIG. 1 and impinges on facet 32 of prism 26. Light beam 30 is transmitted by facet 32 and totally internally reflected by facet 34. It then follows the course shown in FIG. 2 and emerges through surface 20. Thus, light is extracted from the interior of light fixture 10.

In a preferred embodiment of light fixture 10 the prisms, such as prisms 24, 26 and 28, form isosceles triangles having an angle of 69°. This angle is selected because it causes light traveling at an angle of 15° to the axis of the light fixture to be emitted in a direction normal to that axis. The exact angle selected, however, may vary by as much as five or even ten degrees without significantly affecting the performance of the light fixture. Furthermore, other angles may be selected if other amounts of dispersion are desirable.

Figure 3:
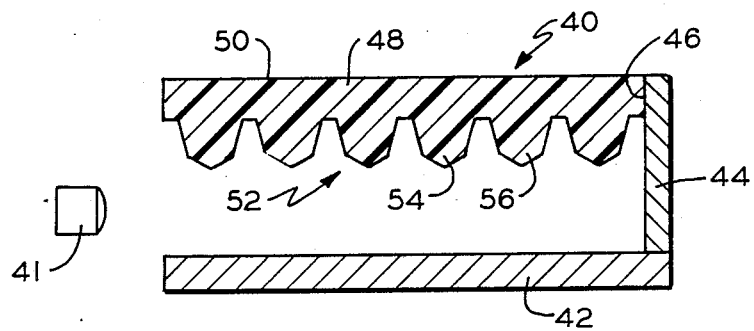
FIG. 3 is a schematic view of a light fixture according to an alternative embodiment of the invention.

Those skilled in the art will readily perceive that it is not required that the structures on structured surface 22 of FIG. 1 be triangular. The key aspect to the invention is that light entering from a narrow angle with respect to the plane of the film will be totally internally reflected once and will emerge through surface 20. FIG. 3 illustrates and embodiment in which four sided structures are used. In the embodiment of FIG. 3, a light fixture 40 has a light source 41, sides 42 and 44, and an optical window 46. Film 48 having a smooth side 50 and a structured side 52, lies in optical window 46. Structured side 52 of film 48 has four sided prisms such as prisms 54 and 56.

Figure 4:
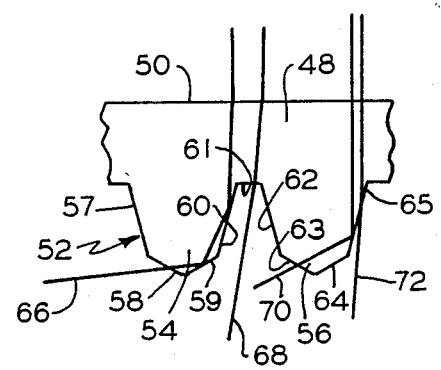
FIG. 4 is an expanded view of the light extraction file used in the light fixture of FIG. 3.

FIG. 4 shows an enlarged view of the portion of film 48 including prisms 54 and 56. Prism 54 has sides 57, 58, 59 and 60. Facet 61 of film 48 separates prisms 54 and 56 and prism 56 includes facets 62, 63, 64 and 65. In operation, light rays may approach film 48 in a variety of manners. Light ray 66 enters prism 54 through facet 58 and is totally internally reflected by facets 59 and 60 before exiting through surface 50. Light ray 68 enters film 48 through facet 61 and exits through surface 50 without undergoing any reflections. Light ray 70 enters prism 56 through facet 63 and is totally internally reflected by facet 65. It then exits also through surface 50. Finally, light ray 72 enters through facet 65 and exits through surface 50 without undergoing any total internal reflections.

The advantage of the four faceted prisms used in light fixture 40 of FIG. 3 lies in their ability to collimate light coming from many directions rather than just the light which enters at a very narrow angle to the plane of the film. Thus, as in the light fixture 10 of FIG. 1, sides 42 and 44 could be specularly reflective. Alternatively, however, they could be made diffusely reflective. The light scattered by such diffusely reflective surfaces would still be well collimated by film 48. Furthermore, film 48 could be used in other types of light fixtures where the light approaches the film at angles other than those which would predominate in the light fixture shown in FIG. 3. Such a film could even be used to substantially collimate light when the light is approaching the film from all directions.

What is claimed:

1. A high aspect ratio light fixture comprising an enclosure having an optical window, said light fixture comprising:

transparent light extraction film in said optical window, said light extraction film having a base layer defining a plane and having a structured surface facing the interior of said enclosure, said surface having linear prisms thereon, each of said prisms having two sides adjacent to said plane, the projections of which meet at a relatively narrow angle and two sides more distant from said plane which meet at a relatively wide angle; and a light source at one end of said enclosure for emitting light such that said light will enter said prisms, be totally internally reflected and emerge through said second surface.

2. The light fixture of claim 1 wherein the interior of said enclosure is reflectorized.

3. A high aspect ratio light fixture comprising an enclosure having an optical window, said light fixture comprising:

transparent light extraction film having a first edge and lying in said optical window, said light extraction film having a structured surface facing the interior of said enclosure, and a second surface facing the exterior of said enclosure, said structured surface having a plurality of linear prisms thereon, each of said prisms having first and second sides, said first and second sides making an angle in the range of 59 to 79 degrees with one another; and a light source at one end of said enclosure and adjacent said first edge of said film for emitting light such that said light will enter said prisms, be totally internally reflected and emerge through said second surface.

4. The light fixture of claim 3 wherein the interior of said enclosure is specularly reflective.

5. The light fixture of claim 3 wherein each of said prisms has a major axis and a cross-section perpendicular to said major axis, said cross-section having two sides extending away from a plane defined by said second surface.

6. The light fixture of claim 5 wherein said first and second sides make an angle of approximately 69 degrees with one another.

7. The light fixture of claim 6 wherein the interior of said enclosure is specularly reflective.

8. A light extraction film of a transparent material, said film having a base layer defining a plane and having a structured surface, said surface having linear prisms thereon, each of said prisms having only four planar sides extending from said plane, two of said sides being adjacent said plane, the projections of which meet at a relatively narrow angle and two of said sides being more distant from said plane which meet at a relatively wide angle.

9. The film of claim 8 wherein adjacent prisms of said linear prisms are separated by a flat surface of said film.

* * * * *